(12) United States Patent
Ebisawa (10) Patent No.: US 9,537,123 B2
(45) Date of Patent: Jan. 3, 2017

(54) ELECTRICAL STORAGE DEVICE

(75) Inventor: Takeshi Ebisawa, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 283 days.

(21) Appl. No.: 14/240,040

(22) PCT Filed: Sep. 4, 2012

(86) PCT No.: PCT/JP2012/072410
§ 371 (c)(1),
(2), (4) Date: Feb. 21, 2014

(87) PCT Pub. No.: WO2013/038941
PCT Pub. Date: Mar. 21, 2013

(65) Prior Publication Data
US 2014/0186676 A1    Jul. 3, 2014

(30) Foreign Application Priority Data
Sep. 16, 2011  (JP) .................... 2011-203126

(51) Int. Cl.
| | |
|---|---|
| *H01M 2/10* | (2006.01) |
| *H01M 2/20* | (2006.01) |
| *H01R 13/74* | (2006.01) |
| *H01R 25/00* | (2006.01) |

(52) U.S. Cl.
CPC ......... *H01M 2/1022* (2013.01); *H01M 2/1072* (2013.01); *H01M 2/1077* (2013.01); *H01M 2/206* (2013.01); *H01R 13/74* (2013.01); *H01R 25/006* (2013.01)

(58) Field of Classification Search
None
See application file for complete search history.

(56) References Cited

U.S. PATENT DOCUMENTS

| | | |
|---|---|---|
| 2010/0247994 A1 | 9/2010 | Park et al. |
| 2010/0320969 A1 | 12/2010 | Sakakibara et al. |
| 2012/0263989 A1* | 10/2012 | Byun .................. H01M 2/1077 429/99 |
| 2014/0148050 A1 | 5/2014 | Ebisawa |

FOREIGN PATENT DOCUMENTS

| | | |
|---|---|---|
| CN | 103703627 A | 4/2014 |
| EP | 0 892 450 A2 | 1/1999 |

(Continued)

OTHER PUBLICATIONS

European Search Report dated Jan. 26, 2015 in European Application No. 12831435.8.

(Continued)

*Primary Examiner* — Jonathan Crepeau
(74) *Attorney, Agent, or Firm* — Collard & Roe, P.C.

(57) ABSTRACT

An electrical storage device includes a housing structure having battery unit housing portions each for housing a battery unit and an attaching object, a plurality of connectors attached to the attaching object, and conductive members connecting between the connectors. The connectors are attached to the attaching object on the battery unit housing portion side. The conductive members connect between the adjacent ones of the connectors on the battery unit housing portion side.

18 Claims, 11 Drawing Sheets (56) References Cited

FOREIGN PATENT DOCUMENTS

| EP | 0 964 470 A1 | 12/1999 |
|---|---|---|
| EP | 2 333 872 A1 | 6/2011 |
| JP | 59-049377 A | 4/1984 |
| JP | 2002-117821 A | 4/2002 |
| JP | 2003-257516 A | 9/2003 |
| JP | 2006-024560 A | 1/2006 |
| JP | 2006-294338 A | 10/2006 |
| JP | 2008-276991 A | 11/2008 |
| JP | 2009-252699 A | 10/2009 |
| JP | 2010-244760 A | 10/2010 |

OTHER PUBLICATIONS

Korean Office Action dated Jun. 22, 2015 in KR 10-2014-7004881, with English translation of relevant part.
International Search Report of PCT/JP2012/072410, mailed Oct. 16, 2012.
Chinese Office Action dated Jun. 16, 2015 in CN 201280041165.2, with English translation.

* cited by examiner

ELECTRICAL STORAGE DEVICE

CROSS REFERENCE TO RELATED APPLICATIONS

This application is the National Stage of PCT/JP2012/072410 filed on Sep. 4, 2012, which claims priority under 35 U.S.C. §119 of Japanese Application No. 2011-203126 filed on Sep. 16, 2011, the disclosure of which is incorporated by reference. The international application under PCT article 21(2) was not published in English.

TECHNICAL FIELD

This invention relates to an electrical storage device.

BACKGROUND ART

Figure 11:
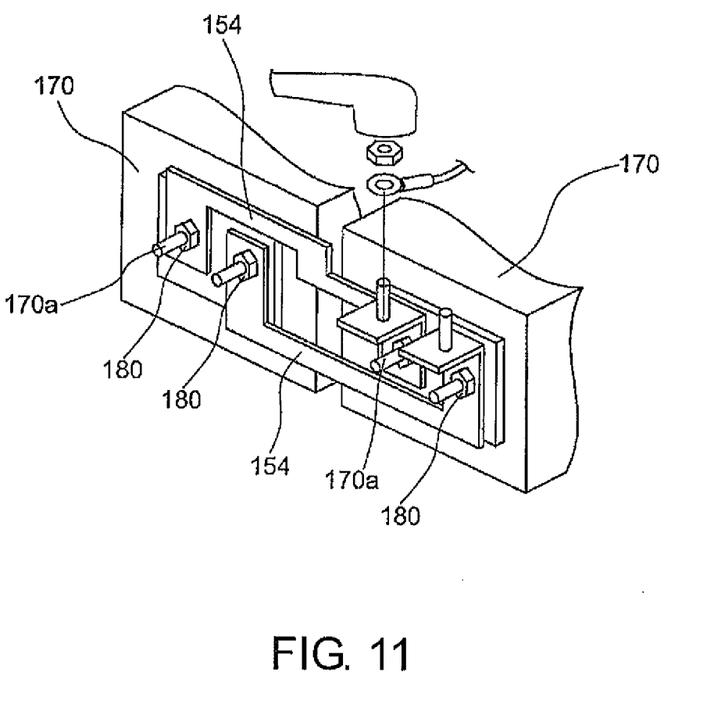
FIG. 11 is a perspective view showing a prior art.

Conventionally, as shown in FIG. 11, there is known a device comprising a plurality of battery units 170 each having input and output terminals 170a, bus bars 154 connecting between the battery units 170, and nuts 180 attached to the input and output terminals 170a and fixing the bus bars 154 to the battery units 170 (see, e.g. JP-A-2003-257516 Patent Document 1).

PRIOR ART DOCUMENT

Patent Document

Patent Document 1: JP-A-2003-257516

SUMMARY OF THE INVENTION

Problem to be Solved by the Invention

However, in the device of Patent Document 1, each time it becomes necessary to remove and attach the battery unit 170 from and to the device, for example, for repairing or replacing the battery unit 170, the bus bars 154 and the nuts 180 should be detached and attached, and therefore, there has been a problem that the time cost and the workload and work risk such as screw fixing failure for the removal and attachment of the battery unit 170 are large.

Therefore, this invention aims to solve the conventional problem, that is, it is an object of this invention to provide an electrical storage device that enables a reduction in workload and work risk and thus allows a battery unit to be simply and safely removed from and attached to the electrical storage device.

Means for Solving the Problem

In order to solve the above-mentioned problem, the present invention provides an electrical storage device comprising a housing structure having a battery unit housing portion for housing a battery unit and an attaching object, a plurality of connectors attached to the attaching object, and conductive members connecting between the plurality of connectors, wherein the plurality of connectors are attached to the attaching object on a battery unit housing portion side thereof, and wherein the conductive members connect between the adjacent ones of the plurality of connectors on the battery unit housing portion side.

The plurality of connectors may be connected in series by the conductive members.

The plurality of connectors may be connected in parallel by the conductive members.

The plurality of connectors may be connected in series and parallel combination by the conductive members.

The housing structure may have a plurality of defined battery unit housing portions and a frame defining the plurality of battery unit housing portions.

The housing structure may have a plurality of battery unit housing portions defined in a lattice shape. In this case, the connector may be provided in each of the plurality of battery unit housing portions.

Each connector may comprise a housing and at least a pair of power supply contacts held by the housing. In this case, each power supply contact integrally may have a contact portion which is brought into contact with the battery unit housed in the battery unit housing portion, and a connecting portion connected to the conductive member, and the different conductive members may be respectively connected to the pair of power supply contacts of the connector.

The contact portion of the power supply contact may have a pin shape or a socket shape.

The contact portion may be formed substantially perpendicular to the connecting portion.

The connectors respectively may have signal contacts and signal lines connecting between the signal contacts.

The signal contacts may be arranged in a plurality in each connector. In this case, the plurality of signal contacts in each connector may be arranged in a lattice shape.

The signal lines may connect the plurality of connectors in series.

Each power supply contact and each conductive member respectively may have holes which are arranged to overlap each other. In this case, the electrical storage device may comprise connecting members each inserted through the hole of the power supply contact and the hole of the conductive member to connect the power supply contact and the conductive member to each other.

Each power supply contact and the housing respectively may have holes which are arranged to overlap each other. In this case, the electrical storage device may comprise connecting members each inserted through the hole of the power supply contact and the hole of the housing to attach the power supply contact and the housing to the attaching object.

At least one of each connector, each power supply contact, and each conductive member may be provided so as to be attachable and detachable from the battery unit housing portion side.

Effect of the Invention

According to this invention, since a housing structure for housing battery units is provided in advance with a plurality of connectors and conductive members connecting between the connectors, the battery units can be connected to each other by the connectors and the conductive members in the state where the battery units are inserted into the housing structure and, only by extraction and insertion operations of each battery unit with respect to the housing structure, it is possible to remove and attach the battery unit from and to an electrical storage device. Therefore, the workload and work risk can be reduced so that each battery unit can be simply and safely removed from and attached to the electrical storage device.

MODE FOR CARRYING OUT THE INVENTION

Hereinbelow, an electrical storage device as one embodiment of this invention will be described with reference to the drawings.

In the following description, a direction in which a battery-side connector is inserted into a connector is defined as a first direction (insertion direction) X, a power supply contact insertion/removal direction with respect to a housing (and a parallel arrangement direction of a pair of power supply contacts with respect to the housing) is defined as a second direction Y, and a direction perpendicular to the first direction X and the second direction Y is defined as a third direction Z. In the following embodiment, a description will be given assuming that the second direction Y is perpendicular to the first direction X. However, it may be configured that the second direction Y is not perpendicular to the first direction X. Further, in the following embodiment, the second direction Y coincides with the horizontal direction and the third direction Z coincides with the vertical direction in the state where the connector is attached to a housing rack. However, the carrying-out manner is not limited thereto.

Embodiment

Figure 1:
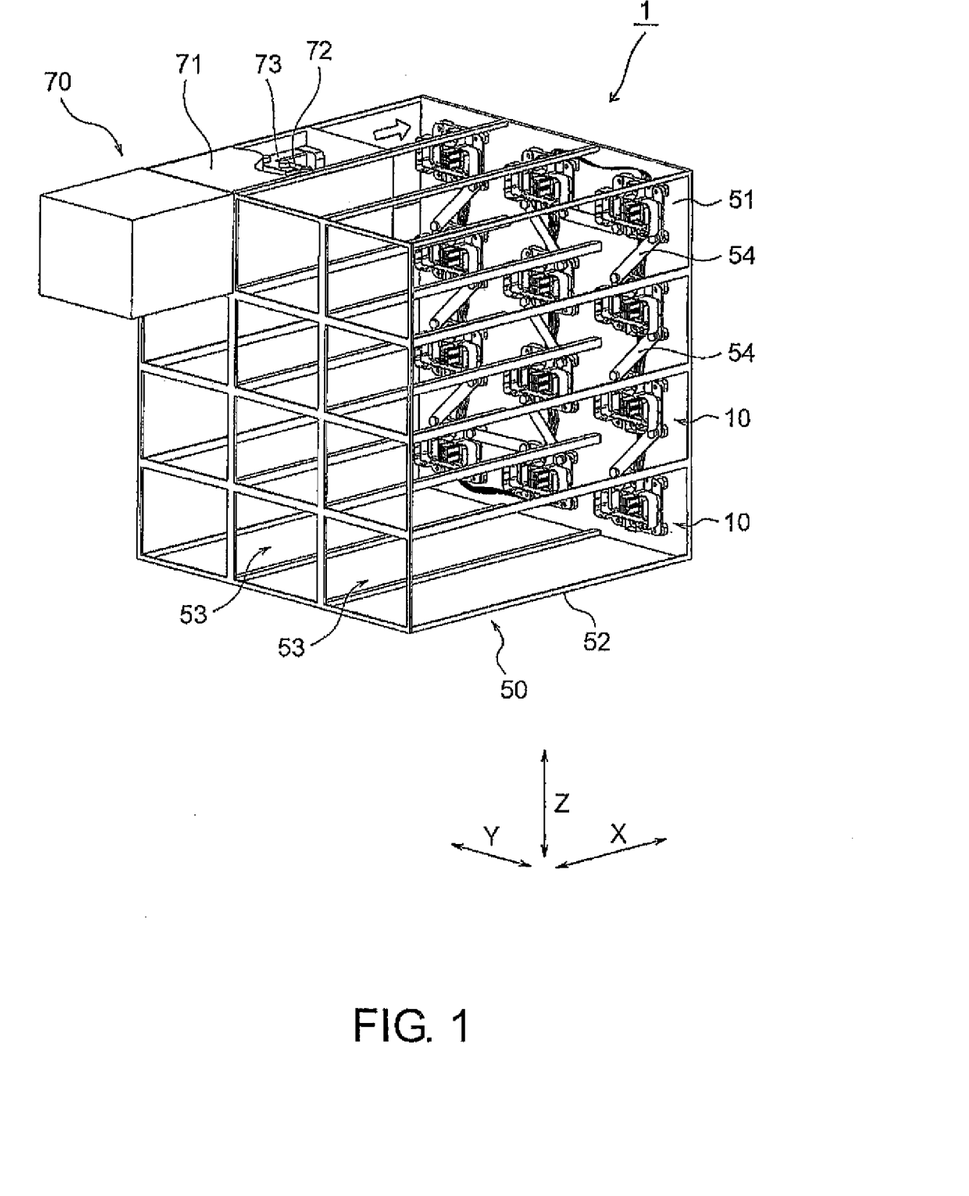
FIG. 1 is a diagram showing the manner of using an electrical storage device according to one embodiment of this invention.

As shown in FIG. 1, an electrical storage device 1 comprises a plurality of connectors 10, bus bars (conductive members) 54 connecting between the connectors 10, and a housing rack (housing structure) 50 having an attaching panel (attaching object) 51 to which the connectors 10 are attached and a frame 52 defining battery unit housing portions 53, wherein battery units 70 inserted into the battery unit housing portions 53 are supported by the frame 52 and connected to each other by the connectors 10 and the bus bars 54.

In the embodiment shown in FIG. 1, it is configured that the battery unit 70 is inserted horizontally into the housing rack 50. However, the direction of the insertion of the battery unit 70 into the housing rack 50 is not limited thereto. For example, it may alternatively be configured that the battery unit 70 is inserted vertically from up to down into the housing rack 50. In this case, the attaching panel 51 to which the connectors 10 are attached may be disposed on the bottom side of the housing rack 50.

Figure 2:
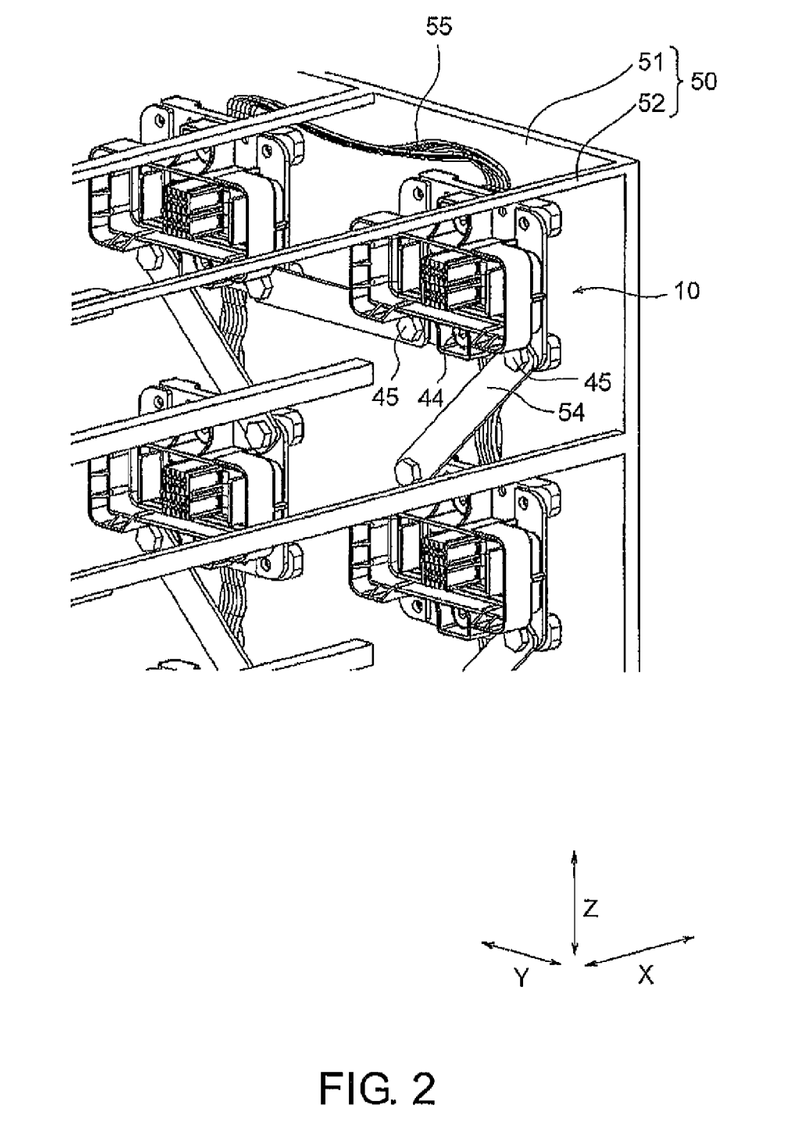
FIG. 2 is a perspective view showing part of FIG. 1 on an enlarged scale.
Figure 3:
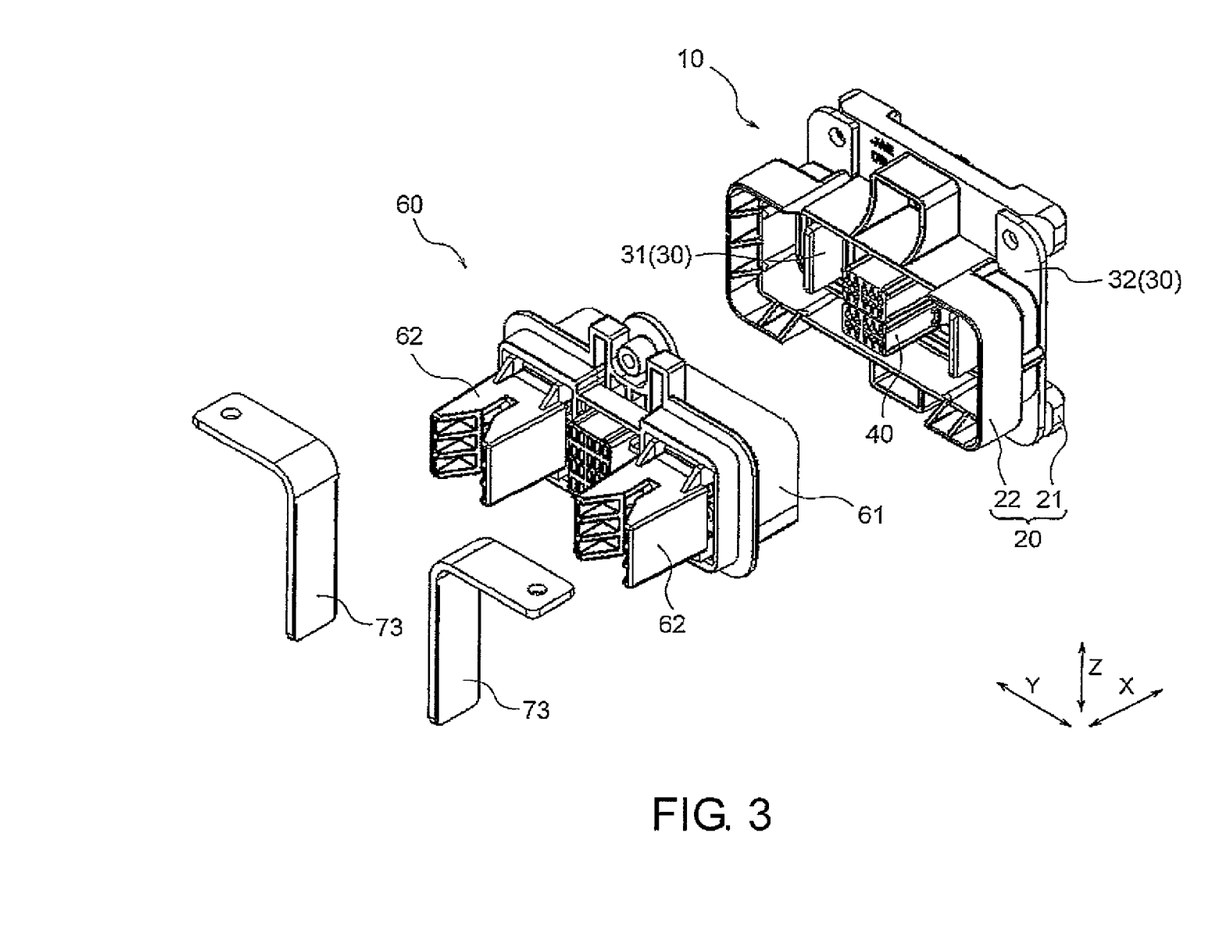
FIG. 3 is a perspective view showing a connector, a battery-side connector, and battery-side bus bars.

The connectors 10 are each a connector for power supply and signal supply. As shown in FIGS. 1 to 3, the connectors 10 are attached to the attaching panel 51 of the housing rack 50 and, when the battery unit 70 is inserted into the housing rack 50, the connector 10 is fitted to a battery-side connector 60 attached to the battery unit 70.

Figure 4:
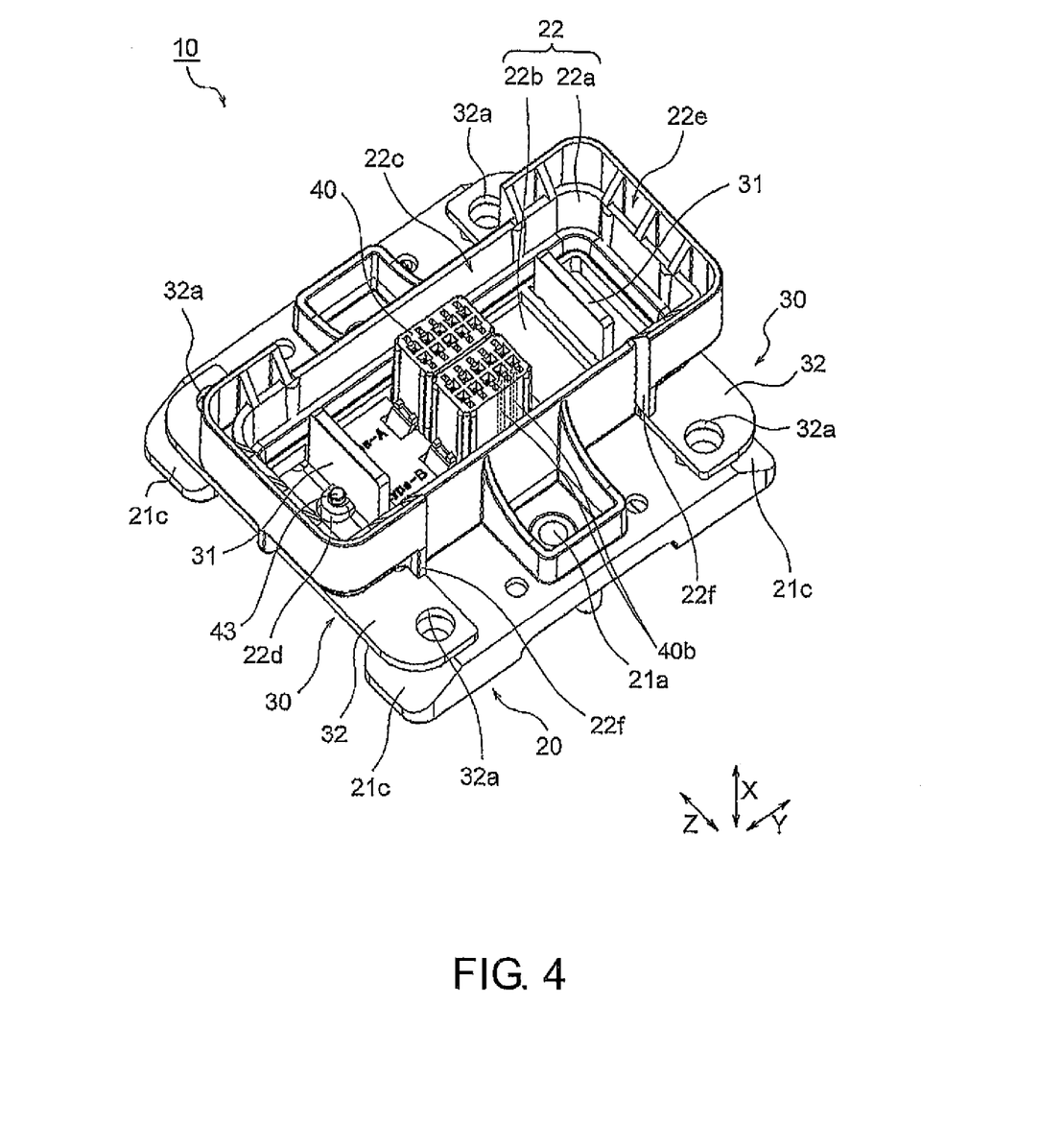
FIG. 4 is a perspective view showing the connector.
Figure 5:
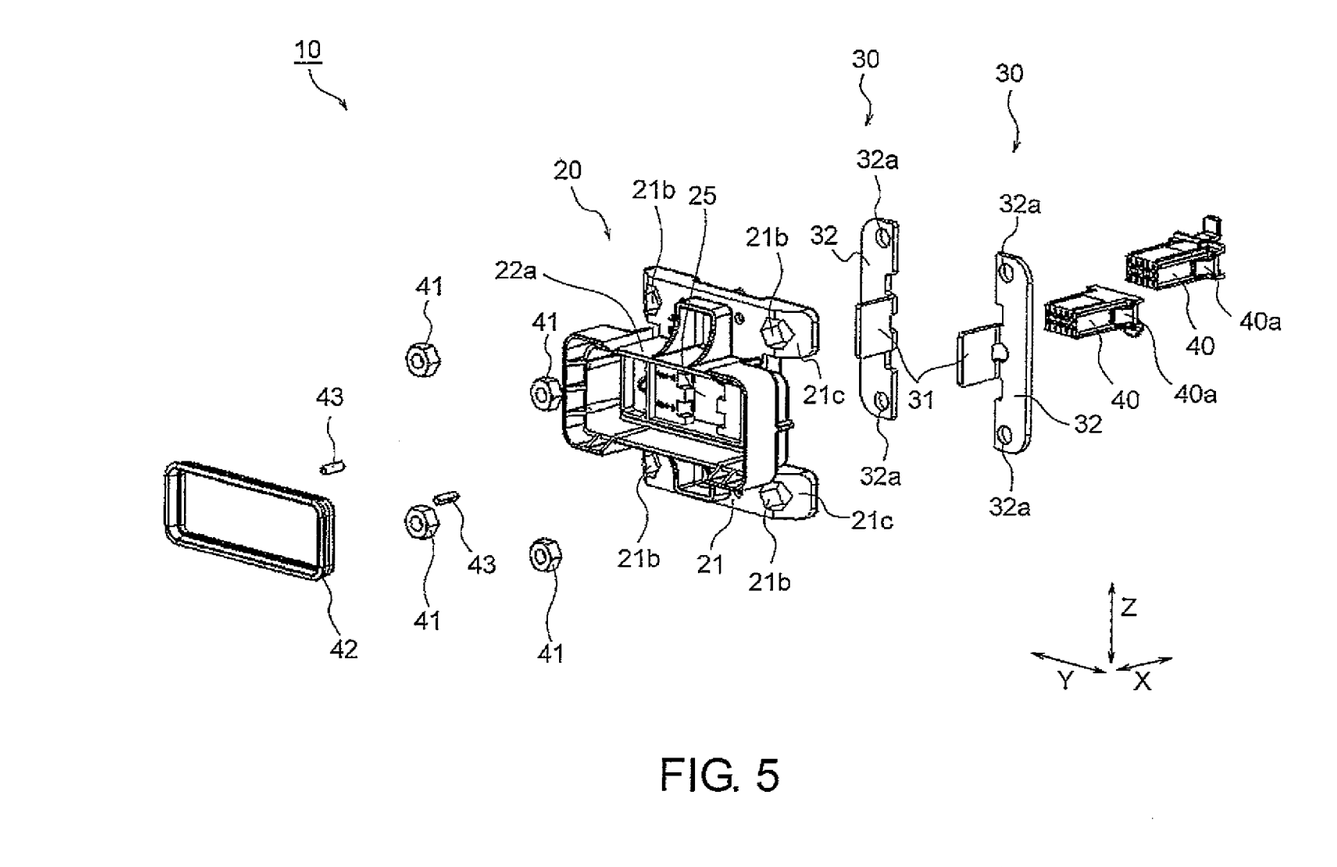
FIG. 5 is an exploded perspective view showing the connector.

As shown in FIGS. 4 and 5, each connector 10 comprises a housing 20 which is fixed on its back side to the attaching panel 51 of the housing rack 50, a pair of power supply contacts 30 which are held by the housing 20, signal housings 40 which are attached to the housing 20 and hold signal contacts 40b, nuts 41 which are attached to the housing 20, a gasket 42 which is attached to the housing 20, and spacer members 43 which are attached to the housing 20, and further comprises, as shown in FIG. 2, first bolts 44 for fixing the housing 20 to the attaching panel 51 and second bolts 45 for fixing the housing 20, the power supply contacts 30, and the bus bars 54 to the attaching panel 51.

Figure 6:
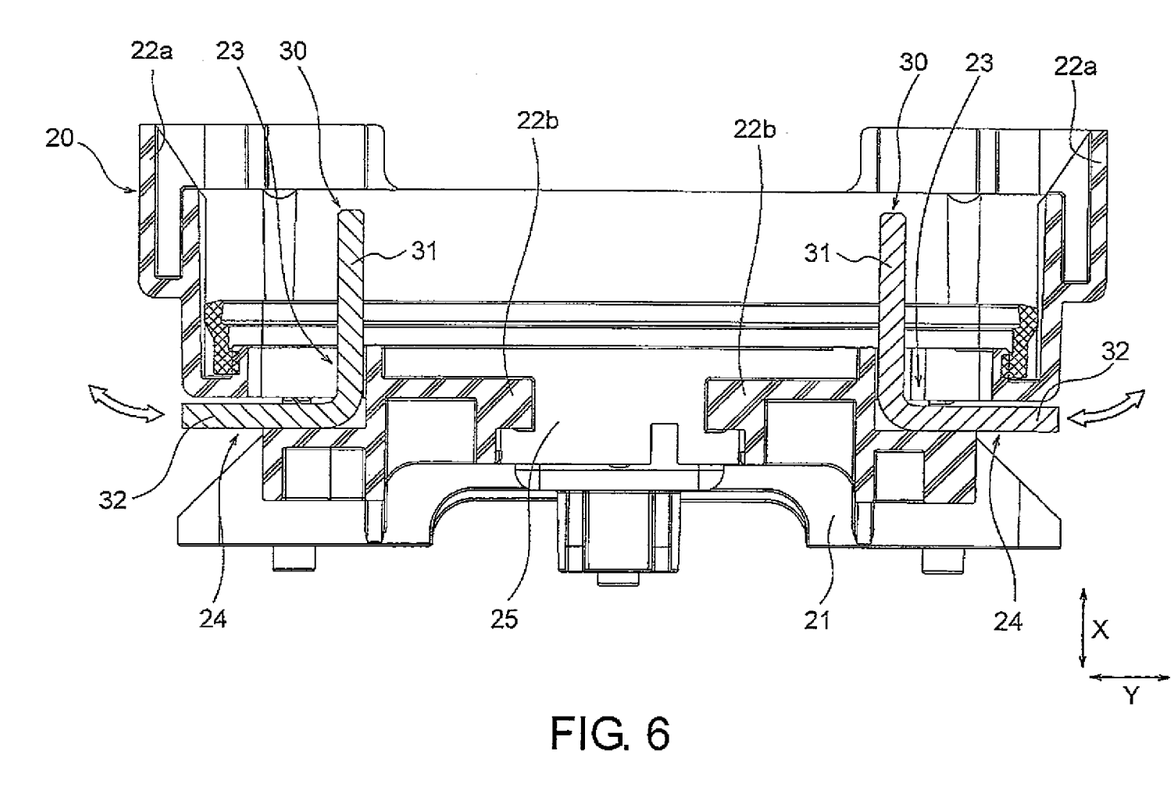
FIG. 6 is an explanatory diagram showing a power supply contact insertion/removal method with the connector and an attaching panel viewed in cross section.

As shown in FIGS. 4 to 6, the housing 20 has an attaching base portion 21 which is fixed to the attaching panel 51 of the housing rack 50, a fitting portion 22 which is disposed more on the front side than the attaching base portion 21, and a signal housing holding portion 25 which is penetratingly formed along the first direction X and holds the signal housings 40.

As shown in FIGS. 4 and 5, the attaching base portion 21 has a portion located outside a receiving frame portion 22a (fitting portion 22) when seen in the first direction X and this portion has first bolt holes 21a for the first bolts 44 to pass through, second bolt holes 21b for the second bolts 45 to pass through, and guide portions 21c for guiding second portions 32 of the power supply contacts 30 when the power supply contacts 30 are attached to and detached from the housing 20.

As shown in FIG. 4, the fitting portion 22 has the receiving frame portion 22a and a bottom portion 22b, a receiving space 22c which is defined by the receiving frame portion 22a and the bottom portion 22b and open to the front side of the housing 20 for allowing the battery-side connector 60 to be inserted and received from the front side of the housing 20, spacer holding portions 22d formed on the bottom portion 22b for holding the spacer members 43, a guide portion 22e formed on an inner wall of the receiving frame portion 22a for guiding the battery-side connector 60, and movement restricting portions 22f each for restricting movement of the second portion 32 of the power supply contact 30 in the first direction X jointly with part, facing the movement restricting portion 22f in the first direction X, of the attaching base portion 21.

As shown in FIG. 6, the housing 20 further has through-holes 23 formed through the bottom portion 22b of the fitting portion 22 along the first direction X and layout spaces 24 each formed between the attaching base portion 21 and the fitting portion 22, each formed toward the side surface side of the housing 20 from an end portion, on the back side, of the through-hole 23, each communicating with the through-hole 23, and each open to the outside on the side surface side of the housing 20.

The through-hole 23 and the layout space 24 have sizes, positions, and shapes that can allow the power supply contact 30 to be disposed at a predetermined position in the housing 20 by inserting the power supply contact 30, with its first portion 31 at the head, into the housing 20 through the layout space 24 from the side surface of the housing 20.

Figure 7:
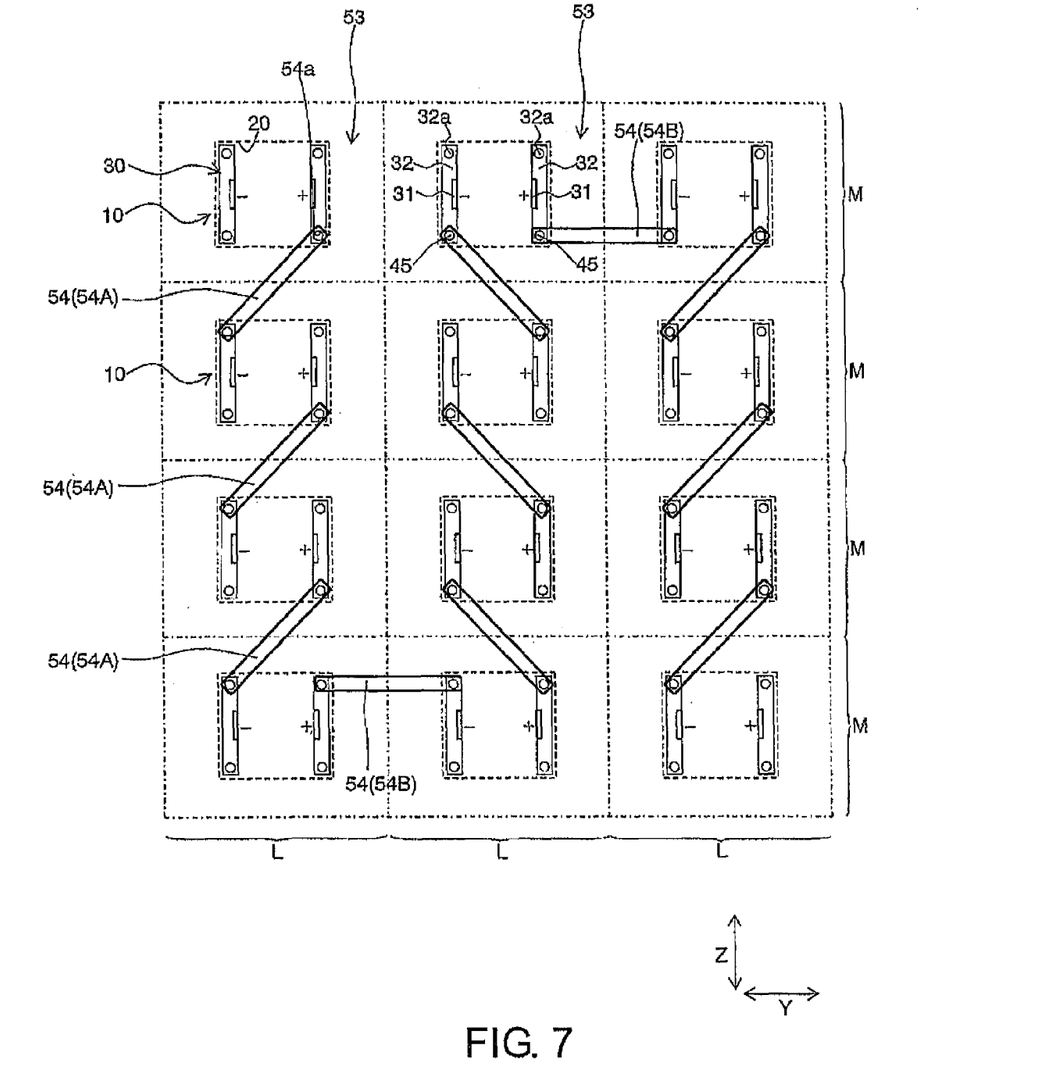
FIG. 7 is an explanatory diagram showing the connector arrangement and the manner of connection between connectors by bus bars.

The power supply contacts 30 are electrically connected to battery-side contacts (not illustrated) of the battery-side connector 60 when the connector 10 and the battery-side connector 60 are fitted to each other. As shown in FIG. 4, the power supply contacts 30 are arranged in a pair parallel to each other in the second direction Y with respect to the housing 20. As shown in FIGS. 1 and 7, the power supply contacts 30 of the connectors 10 attached to the housing rack 50 are connected to each other by the bus bars 54 so that the connectors 10 are connected in series by the bus bars 54. The power supply contacts 30 are disposed in an insulated state from the signal contacts 40b.

The power supply contacts 30 are formed of a conductive metal (tough pitch copper, copper with a purity of about 99%) and have the same shape. Each power supply contact 30 has a conductivity of 50% or more assuming that the conductivity of pure copper is 100%. Each power supply contact 30 is formed by punching a metal plate into a predetermined shape and then bending a predetermined portion thereof and thus has a shape with no overlapping portion when developed on a plane.

As shown in FIGS. 4 and 5, each power supply contact 30 integrally has the second portion 32 formed in a flat plate shape and the first portion 31 of a flat plate shape standing perpendicular (or substantially perpendicular) to the second portion 32 at the middle, in a longitudinal direction, of the second portion 32.

As shown in FIGS. 4 and 6, the first portion 31 of the power supply contact 30 extends in the first direction X and, in the state where the power supply contact 30 is mounted to the housing 20, the first portion 31 is partially disposed in the through-hole 23 and partially disposed in the receiving space 22c. The first portion 31 located in the receiving space 22c serves as a contact portion which is brought into contact with the battery-side contact (not illustrated) of the battery-side connector 60. In this embodiment, the power supply contact 30 is formed as a pin contact so that the first portion (contact portion) 31 is formed in a pin shape. However, the first portion (contact portion) 31 may be formed in a socket shape.

As shown in FIGS. 4 and 6, the second portion 32 of the power supply contact 30 is partially disposed in the layout space 24 in the state where the power supply contact 30 is mounted to the housing 20. The second portion 32 has portions located outside the receiving frame portion 22a (fitting portion 22) and protruding toward both sides in the third direction Z when seen in the first direction X and these portions each have a bolt hole 32a for the second bolt 45 to pass through. As shown in FIG. 4, the bolt holes 32a are respectively formed at both ends, in the third direction Z, of the second portion 32 and, in the state where the power supply contact 30 is mounted to the housing 20, the bolt holes 32a are formed at positions overlapping, in the first direction X, the second bolt holes 21b formed in the attaching base portion 21. The second portion 32 of the power supply contact 30 serves as connecting portions with the bus bars 54.

The signal housings 40 are inserted from the back side of the housing 20 into the signal housing holding portion 25 formed in the housing 20 and are locked to the housing 20 by mounting spring portions 40a provided to the signal housings 40. As shown in FIG. 4, the signal housings 40 are partially located in the receiving space 22c of the housing 20. Symbol 55 shown in FIG. 2 denotes signal lines (electric wires) connecting the signal contacts 40b of the connectors 10 in series and thus connecting the connectors 10 in series. The signal housings 40 are arranged in a pair in each connector 10. The signal contacts 40b are arranged in a plurality in each connector 10 (in each signal housing 40).

In each connector 10 (in each signal housing 40), the signal contacts 40b are arranged in a lattice shape in a mutually insulated state.

Each spacer member 43 is formed as a spring pin having a groove on its outer periphery. As shown in FIGS. 4 and 5, each spacer member 43 is detachably mounted to the spacer holding portion 22d of the housing 20 from the front side of the housing 20 and presses the first portion 31 of the power supply contact 30 against an edge portion of the through-hole 23 in the second direction Y, thereby preventing backlash between the through-hole 23 and the first portion 31.

As shown in FIG. 2, each first bolt 44 is fitted from the front side of the housing 20 into the first bolt hole 21a formed in the housing 20 and a bolt hole (not illustrated) formed in the attaching panel 51, thereby fixing the housing 20 to the attaching panel 51.

As shown in FIG. 2, each second bolt (connecting member) 45 is fitted from the front side of the housing 20 into the second bolt hole 21b formed in the housing 20, the bolt hole 32a formed in the second portion 32 of the power supply contact 30, a bolt hole 54a formed in the bus bar 54, and a bolt hole (not illustrated) formed in the attaching panel 51, thereby fixing the housing 20, the power supply contact 30, and the bus bar 54 to the attaching panel 51 and thus connecting the bus bar 54 and the power supply contact 30 together.

The specific manner of fixing the housing 20, the power supply contact 30, and the bus bar 54 to the attaching panel 51 is not limited to the above. For example, the housing 20, the power supply contact 30, and the bus bar 54 may be fixed to the attaching panel 51 by a pin (connecting member) which is press-fitted into the attaching panel 51. The second bolt (connecting member) 45 may be fixed using a nut. Alternatively, a tapping screw (connecting member), which requires no nut or bolt hole, may be used. Further, a spring washer may be interposed if necessary.

As shown in FIGS. 1 and 2, the housing rack 50 has the attaching panel 51 to which the connectors 10 are attached, and the frame 52 defining the battery unit housing portions 53 each for housing the battery unit 70. The battery unit 70 is guided by the frame 52 of the housing rack 50 when it is inserted into the housing rack 50, while, the battery unit 70 is supported by the frame 52 of the housing rack 50 when it is housed in the housing rack 50.

The battery-side connector 60 is attached to a casing 71 of the battery unit 70 and, when the battery unit 70 is inserted into the housing rack 50, the battery-side connector 60 is fitted to the connector 10 attached to the housing rack 50, thereby establishing electrical connection between battery-side bus bars 73 incorporated in the battery unit 70 and connected to batteries (secondary batteries) 72 and the power supply contacts 30. As shown in FIG. 3, the battery-side connector 60 comprises a first battery-side housing 61 which is attached to the casing 71 in the state where it is movable at least in the second direction Y, second battery-side housings 62 each attached to the first battery-side housing 61 so as to be movable in the second direction Y relative to the first battery-side housing 61, and power supply battery-side contacts (not illustrated) housed in contact housing portions (not illustrated) each formed by the first battery-side housing 61 and the second battery-side housing 62.

Next, a method for replacing the power supply contact 30 will be described hereinbelow.

Herein, in the connector 10 for use in power supply, it may happen that the power supply contact 30 is damaged due to heat generation or the like caused by flowing a large current and thus should be replaced immediately. In the connector 10, the power supply contact 30 is replaced by the following steps.

First, in the state where the housing 20 and the attaching panel 51 are fixed together without removing the first bolts 44, the second bolt 45 fixing the housing 20, the power supply contact 30, and the bus bar 54 to the attaching panel 51 is removed from the front side of the housing 20 (first step).

Then, the spacer member 43 is removed from the housing 20 on the front side of the housing 20 (second step). The order of the first and second steps may be reversed to the above.

Herein, in the state after the first and second steps, the movement of the first portion 31 of the power supply contact 30 is restricted in the second direction Y and the third direction Z by the edge portion of the through-hole 23 while the movement of the second portion 32 of the power supply contact 30 is restricted in the first direction X by the attaching base portion 21 and the movement restricting portion 22*f*. Consequently, the power supply contact 30 is loosely held by the housing 20 and thus does not come off the housing 20.

Then, as shown in FIG. 6, the power supply contact 30 is caused to slide outward in the second direction Y relative to the housing 20 so that the first portion 31 of the power supply contact 30 is pulled out of the through-hole 23 and simultaneously the second portion 32 of the power supply contact 30 is pulled out of the layout space 24, thereby removing the power supply contact 30 from the layout space 24 which is open to the outside at the side surface of the housing 20 (third step).

Then, a new power supply contact 30 is inserted, with its first portion 31 at the head, into the housing 20 through the layout space 24 so that the power supply contact 30 is disposed at the predetermined position in the housing 20 (fourth step).

Herein, in the state after the fourth step, the movement of the first portion 31 of the power supply contact 30 is restricted in the second direction Y and the third direction Z by the edge portion of the through-hole 23 while the movement of the second portion 32 of the power supply contact 30 is restricted in the first direction X by the attaching base portion 21 and the movement restricting portion 22*f*. Consequently, the power supply contact 30 is loosely held by the housing 20 and thus does not come off the housing 20.

Then, using the second bolt 45, the housing 20, the power supply contact 30, and the bus bar 54 are fixed to the attaching panel 51 (fifth step).

Finally, the spacer member 43 is mounted to the spacer holding portion 22*d* of the housing 20 (sixth step). The order of the fifth and sixth steps may be reversed to the above.

Figure 8:
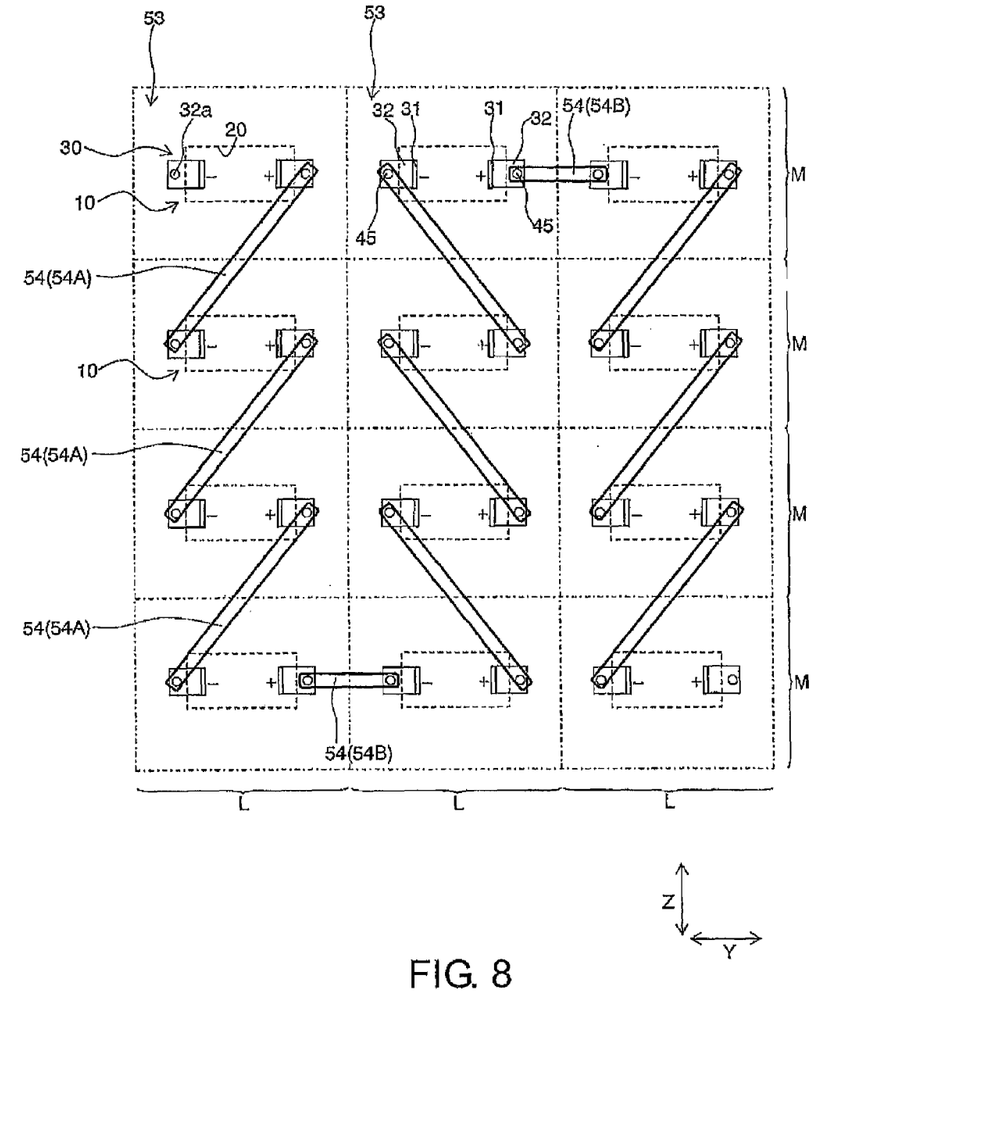
FIG. 8 is an explanatory diagram showing a comparative example of the connector arrangement and the manner of connection between connectors by bus bars.

Next, the manner of arrangement of the connectors 10 with respect to the housing rack 50 and the manner of connection between the connectors 10 by the bus bars 54 will be described hereinbelow with reference to FIG. 7 showing the carrying-out manner of this embodiment and FIG. 8 showing the carrying-out manner of a comparative example.

First, in this embodiment, as shown in FIG. 7, when seen in the first direction X, the battery unit housing portions 53 are arranged in a lattice shape with 3 rows×4 columns (second direction Y×third direction Z) and, following this, the connectors 10 are attached to the attaching panel 51 in a lattice shape with 3 rows×4 columns (second direction Y×third direction Z). The specific numbers of rows and columns are not limited to the above.

In order that combinations of the battery units 70 and the battery unit housing portions 53 may not be restricted, that is, in order to allow any battery unit 70 to be housed in any battery unit housing portion 53, all the battery unit housing portions 53 have the same structure, all the connectors 10 have the same structure, and all the battery units 70 have the same structure.

As described before, the connectors 10 are connected in series by the bus bars 54.

Therefore, as shown in FIG. 7 (or FIG. 8), when connecting the connectors 10 in series using the bus bars 54, the right-side (or left-side) power supply contacts 30 of the connectors 10 located above and the left-side (or right-side) power supply contacts 30 of the connectors 10 located below are obliquely connected to each other by the bus bar 54 to thereby connect together the connectors 10 aligned in the third direction Z and further the connectors 10 adjacent to each other in the second direction Y are connected together by the bus bar 54 disposed along the second direction Y.

Herein, the dimension M in the third direction Z of each battery unit housing portion 53 and the dimension L in the second direction Y of each battery unit housing portion 53 are determined according to the dimensions in the second direction Y and the third direction Z of the battery unit 70. Therefore, as shown in FIG. 8 of the comparative example, when each power supply contact 30 is provided with a single bolt hole 32*a*, it is difficult to adjust the dimensional relationship between the bus bar 54 (54A) for connection between the connectors 10 in the third direction Z and the bus bar 54 (54B) for connection between the connectors 10 in the second direction Y so that the bus bars with two kinds of dimensions are required.

In view of this, in this embodiment, as shown in FIG. 7, each power supply contact 30 is provided with the two bolt holes 32*a* and these two bolt holes 32*a* are aligned in the third direction Z, thereby adjusting the required dimension of the bus bar 54 (54A) for connection between the connectors 10 in the third direction Z so that the dimension of the bus bar 54 (54A) for connection between the connectors 10 in the third direction Z and the dimension of the bus bar 54 (54B) for connection between the connectors 10 in the second direction Y are set to be equal to each other.

Figure 9:
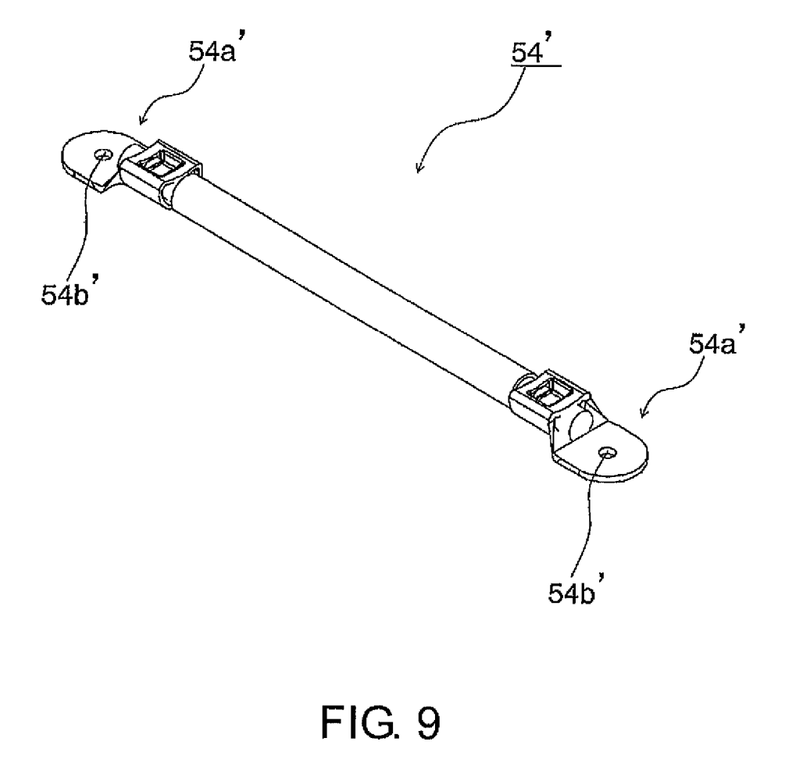
FIG. 9 is a perspective view showing a feeder as a modification of a conductive member.

The description has been given of the carrying-out manner using the bus bar 54 as the conductive member for connection between the connectors 10. However, a specific manner of the conductive member may be any as long as it can connect between the connectors 10. For example, a feeder 54' shown in FIG. 9 may be used instead of each of part or all of the bus bars 54. Terminals 54*a*' each having a hole 54*b*' for the second bolt 45 to pass through are connected to both ends of the feeder 54'.

Figure 10:
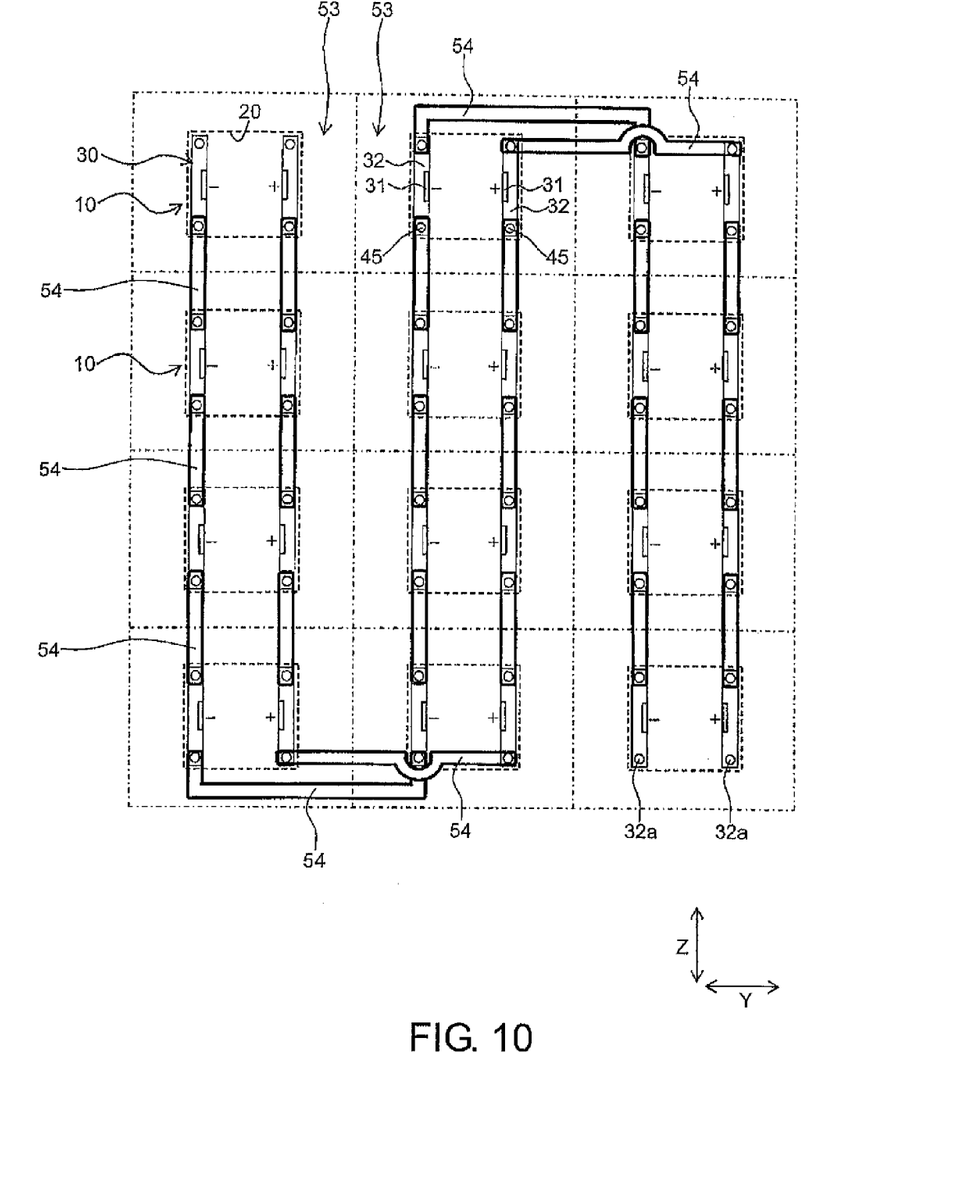
FIG. 10 is an explanatory diagram showing an embodiment in which connectors are connected in parallel.

The description has been given assuming that the connectors 10 are connected in series by the conductive members (bus bars 54). However, as shown in FIG. 10, the connectors 10 may be connected in parallel by conductive members (bus bars 54). Further, the connectors 10 may be connected in series and parallel combination by conductive members (bus bars 54).

According to this invention thus obtained, since the housing rack 50 for housing the battery units 70 is provided in advance with the connectors 10 and the conductive members (bus bars 54) connecting between the connectors 10, the battery units 70 can be connected to each other by the connectors 10 and the conductive members (bus bars 54) in the state where the battery units 70 are inserted into the housing rack 50 and, only by the extraction and insertion operations of each battery unit 70 with respect to the housing rack 50, it is possible to remove and attach the battery unit 70 from and to the electrical storage device 1. Therefore, the workload and work risk can be reduced so that each battery unit 70 can be simply and safely removed from and attached to the electrical storage device 1.

Since the connector 10 is attached to the attaching panel 51 from the battery unit housing portion 53 side using the first and second bolts 44 and 45 which are fitted through the connector 10 from the battery unit housing portion 53 side, it is possible to easily attach and detach the connector 10 on the battery unit housing portion 53 side where a workspace is easy to ensure.

Since the conductive member (bus bar 54) is attached to the connector 10 and the attaching panel 51 from the battery unit housing portion 53 side using the second bolt 45 which is fitted through the conductive member (bus bar 54) from the battery unit housing portion 53 side, it is possible to easily attach and detach the conductive member (bus bar 54) on the battery unit housing portion 53 side where a workspace is easy to ensure.

Since the connector 10 is configured such that the power supply contact 30 can be inserted and removed from the side surface side of the housing 20, the insertion/removal operation of the power supply contact 30 can be carried out on the front side, where the fitting portion 22 to the battery-side connector 60 is disposed, of the housing 20. Therefore, a workspace is easy to ensure so that the replacement operation of the power supply contact 30 can be easily achieved in the state where the connector 10 is attached to the attaching panel 51, and further, it is not necessary to ensure a workspace on the back side of the attaching panel 51 so that space saving of the device can be realized.

DESCRIPTION OF SYMBOLS

1 electrical storage device
10 connector
20 housing
21 attaching base portion
21*a* first bolt hole
21*b* second bolt hole
21*c* guide portion
22 fitting portion
22*a* receiving frame portion
22*b* bottom portion
22*c* receiving space
22*d* spacer holding portion
22*e* guide portion
22*f* movement restricting portion
23 through-hole
24 layout space
25 signal housing holding portion
30 power supply contact
31 first portion (contact portion)
32 second portion (connecting portion)
32*a* bolt hole
40 signal housing
40*a* mounting spring portion
40*b* signal contact
41 nut
42 gasket
43 spacer member
44 first bolt
45 second bolt (connecting member)
50 housing rack (housing structure)
51 attaching panel (attaching object)
52 frame
53 battery unit housing portion
54, 54A, 54B bus bar
54*a* bolt hole
54' feeder
54*a*' terminal
54*b*' hole
55 signal line
60 battery-side connector
61 first battery-side housing
62 second battery-side housing
70 battery unit
71 casing
72 battery
73 battery-side bus bar
X first direction
Y second direction
Z third direction

The invention claimed is:

1. An electrical storage device comprising a housing structure having a battery unit housing portion for housing a battery unit and an attaching object, a plurality of connectors attached to the attaching object, and bus bars and/or feeders connecting between the plurality of connectors,
   wherein the plurality of connectors are attached to the attaching object on a battery unit housing portion side thereof,
   wherein the bus bars and/or feeders connect between the adjacent ones of the plurality of connectors on the battery unit housing portion side,
   wherein first connections and second connections are independent of each other, the first connections being connections between the bus bars and/or the feeders and the plurality of connectors, the second connections being connections between the plurality of connectors and battery units,
   wherein each connector comprises a housing and at least a pair of power supply contacts held by the housing,
   wherein each power supply contact integrally has a contact portion which is brought into contact with the battery unit housed in the battery unit housing portion, and a connecting portion connected to a respective bus bar of the bus bars and/or a respective feeder of the feeders,
   wherein the different bus bars and/or the different feeders are respectively connected to the pair of power supply contacts of the connector,
   wherein each power supply contact and each bus bar and/or each feeder respectively have holes which are arranged to overlap each other, and
   wherein the electrical storage device comprises connecting members each inserted through the hole of the power supply contact and the hole of the bus bar and/or of the feeder to connect the power supply contact and the bus bar and/or the feeder to each other.

2. The electrical storage device according to claim 1, wherein the plurality of connectors are connected in series by the bus bars and/or the feeders.

3. The electrical storage device according to claim 1, wherein the plurality of connectors are connected in parallel by the bus bars and/or the feeders.

4. The electrical storage device according to claim 1, wherein the plurality of connectors are connected in series and parallel combination by the bus bars and/or the feeders.

5. The electrical storage device according to claim 1, wherein the housing structure has a plurality of defined battery unit housing portions and a frame defining the plurality of battery unit housing portions.

6. The electrical storage device according to claim 1, wherein the housing structure has a plurality of battery unit housing portions defined in a lattice shape, and wherein the connector is provided in each of the plurality of battery unit housing portions.

7. The electrical storage device according to claim 1, wherein the contact portion of the power supply contact has a pin shape or a socket shape.

8. The electrical storage device according to claim 1, wherein the contact portion is formed perpendicular to the connecting portion.

9. The electrical storage device according to claim 1, wherein the connectors respectively have signal contacts and signal lines connecting between the signal contacts.

10. The electrical storage device according to claim 9,
wherein the signal contacts are arranged in a plurality in each connector, and
wherein the plurality of signal contacts in each connector are arranged in a lattice shape.

11. The electrical storage device according to claim 9, wherein the signal lines connect the plurality of connectors in series.

12. The electrical storage device according to claim 1,
wherein a first connector of the connectors, a first power supply contact of a pair of power supply contacts held by the housing, and a first bus bar and/or a first feeder of the bus bars and/or the feeders are provided so as to be attachable and detachable from the battery unit housing portion side.

13. An electrical storage device comprising a housing structure having a battery unit housing portion for housing a battery unit and an attaching object, a plurality of connectors attached to the attaching object, and bus bars and/or feeders connecting between the plurality of connectors,
wherein the plurality of connectors are attached to the attaching object on a battery unit housing portion side thereof,
wherein the bus bars and/or feeders connect between the adjacent ones of the plurality of connectors on the battery unit housing portion side,
wherein first connections and second connections are independent of each other, the first connections being connections between the bus bars and/or the feeders and the plurality of connectors, the second connections being connections between the plurality of connectors and battery units,
wherein each connector comprises a housing and at least a pair of power supply contacts held by the housing,
wherein each power supply contact integrally has a contact portion which is brought into contact with the battery unit housed in the battery unit housing portion, and a connecting portion connected to a respective bus bar of the bus bars and/or a respective feeder of the feeders,
wherein the different bus bars and/or the different feeders are respectively connected to the pair of power supply contacts of the connector,
wherein each power supply contact and the housing respectively have holes which are arranged to overlap each other, and
wherein the electrical storage device comprises connecting members each inserted through the hole of the power supply contact and the hole of the housing to attach the power supply contact and the housing to the attaching object.

14. The electrical storage device according to claim 13, wherein the plurality of connectors are connected in series by the bus bars and/or the feeders.

15. The electrical storage device according to claim 13, wherein the plurality of connectors are connected in parallel by the bus bars and/or the feeders.

16. The electrical storage device according to claim 13, wherein the plurality of connectors are connected in series and parallel combination by the bus bars and/or the feeders.

17. The electrical storage device according to claim 13, wherein the housing structure has a plurality of defined battery unit housing portions and a frame defining the plurality of battery unit housing portions.

18. The electrical storage device according to claim 13, wherein the housing structure has a plurality of battery unit housing portions defined in a lattice shape, and
wherein the connector is provided in each of the plurality of battery unit housing portions.

* * * * *